(12) United States Patent
Bellehumeur et al.

(10) Patent No.: US 7,264,091 B2
(45) Date of Patent: Sep. 4, 2007

(54) INLINE SKATE BRAKE

(76) Inventors: Alex R. Bellehumeur, 6242 Napolii Ct., Long Beach, CA (US) 90803; Drew Krah, 7057 Haskett #218, Van Nuys, CA (US) 91406

( * ) Notice: Subject to any disclaimer, the term of this patent is extended or adjusted under 35 U.S.C. 154(b) by 0 days.

(21) Appl. No.: 10/962,340

(22) Filed: Oct. 9, 2004

(65) Prior Publication Data
US 2005/0161294 A1  Jul. 28, 2005

Related U.S. Application Data

(63) Continuation-in-part of application No. 10/766,600, filed on Jan. 27, 2004, now Pat. No. 6,948,723.

(51) Int. Cl.
*B60B 33/00* (2006.01)
*A63C 17/14* (2006.01)

(52) U.S. Cl. ............... 188/1.12; 280/11.204; 280/11.206; 280/11.211

(58) Field of Classification Search .............. 188/72.1, 188/72.3, 1.12; 280/11.204, 11.206, 11.207, 280/11.208, 11.209, 11.211, 11.212, 11.215, 280/11.216, 11.217
See application file for complete search history.

(56) References Cited

U.S. PATENT DOCUMENTS

| | | | | |
|---|---|---|---|---|
| 5,143,387 | A | * | 9/1992 | Colla ................... 280/11.207 |
| 5,171,032 | A | * | 12/1992 | Dettmer ................ 280/11.212 |
| 5,511,805 | A | * | 4/1996 | McGrath ............... 280/11.211 |
| 5,639,104 | A | | 6/1997 | Haldemann ............... 280/112 |
| 5,779,245 | A | * | 7/1998 | Smith et al. ........... 280/11.204 |
| 5,895,061 | A | | 4/1999 | Gignoux ................. 280/11.2 |
| 5,938,213 | A | | 8/1999 | Gignoux ................. 280/11.2 |
| 6,065,761 | A | | 5/2000 | Gignoux et al. .......... 280/11.2 |
| 6,557,864 | B1 | | 5/2003 | Lenoir .................. 280/11.221 |
| 6,598,887 | B2 | * | 7/2003 | Haldemann ............ 280/11.221 |

* cited by examiner

*Primary Examiner*—Melody M. Burch
(74) *Attorney, Agent, or Firm*—Fulwider Patton LLP

(57) ABSTRACT

A brake assembly for inline skates having a boot portion with right and left downwardly directed frame members. The frame members support at least three axles. Right and left carrier plates are positioned along an inner face of the downwardly directed frame members. At least two diabolos are supported by the right and left carrier plates. The diabolos each contact two wheels and are forced outwardly to provide a friction rubbing action against the carrier plates when the carrier plates have moved from a disengaged position to an engaged position.

13 Claims, 3 Drawing Sheets

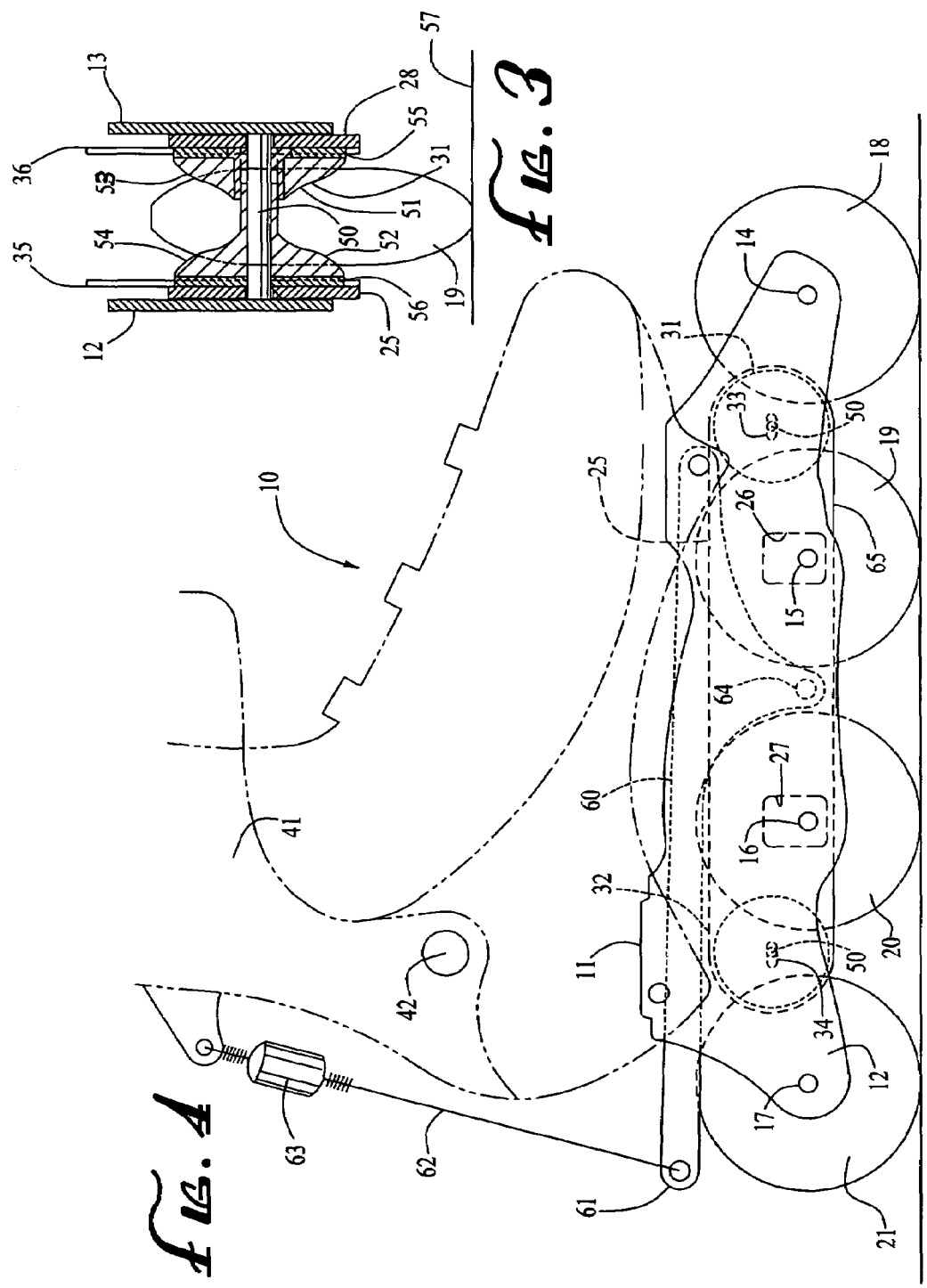

US 7,264,091 B2

INLINE SKATE BRAKE

CROSS REFERENCE TO RELATED APPLICATIONS

This application is a continuation in part of applicant's application Ser. No. 10/766,600 filed Jan. 27, 2004 now U.S. Pat. No. 6,948,723, which is incorporated by reference herein.

BACKGROUND OF THE INVENTION

The field of the invention is Inline Skate Brakes and the invention relates more particularly to Inline Skate Brakes of a type which have at least two "diabolos." The term "diabolo" is intended to mean a roller which has two halves and a center portion having a reduced diameter. An example of such a diabolo is shown in U.S. Pat. No. 5,639,104. Such diabolos can put substantial braking force on one or more wheels to the extent where such wheels are subject to lock up. This is undesirable and a system which distributed the braking force among all four wheels would be beneficial.

BRIEF SUMMARY OF THE INVENTION

The present invention is for a brake assembly for Inline Skates having at least three wheels supported by a downwardly directed frame member. A right and a left carrier plate are positioned on inner surfaces of the frame members inwardly of the wheels. The carrier plates support two diabolos. A forward diabolo contacts two forward-most wheels and a rearward diabolo contacts the two rearward most wheels. In this way a braking force is exerted on all four wheels greatly reducing the chance of a wheel lock up. The carrier plates are moved upwardly or downwardly by being linked to a pivotal collar position around the ankle portion of the boot of the inline skate. They are moved upwardly if the diabolos are positioned below the axis of the wheels and downwardly if the diabolos are positioned above the axis of the wheels.

BRIEF DESCRIPTION OF THE DRAWINGS

FIG. 3 is an enlarged front view of one of the diabolos of the assembly of FIG. 1.

FIG. 4 is a side view of an alternate embodiment of the skate brake assembly of the present invention.

DESCRIPTION OF THE PREFERRED EMBODIMENTS

Figure 1:
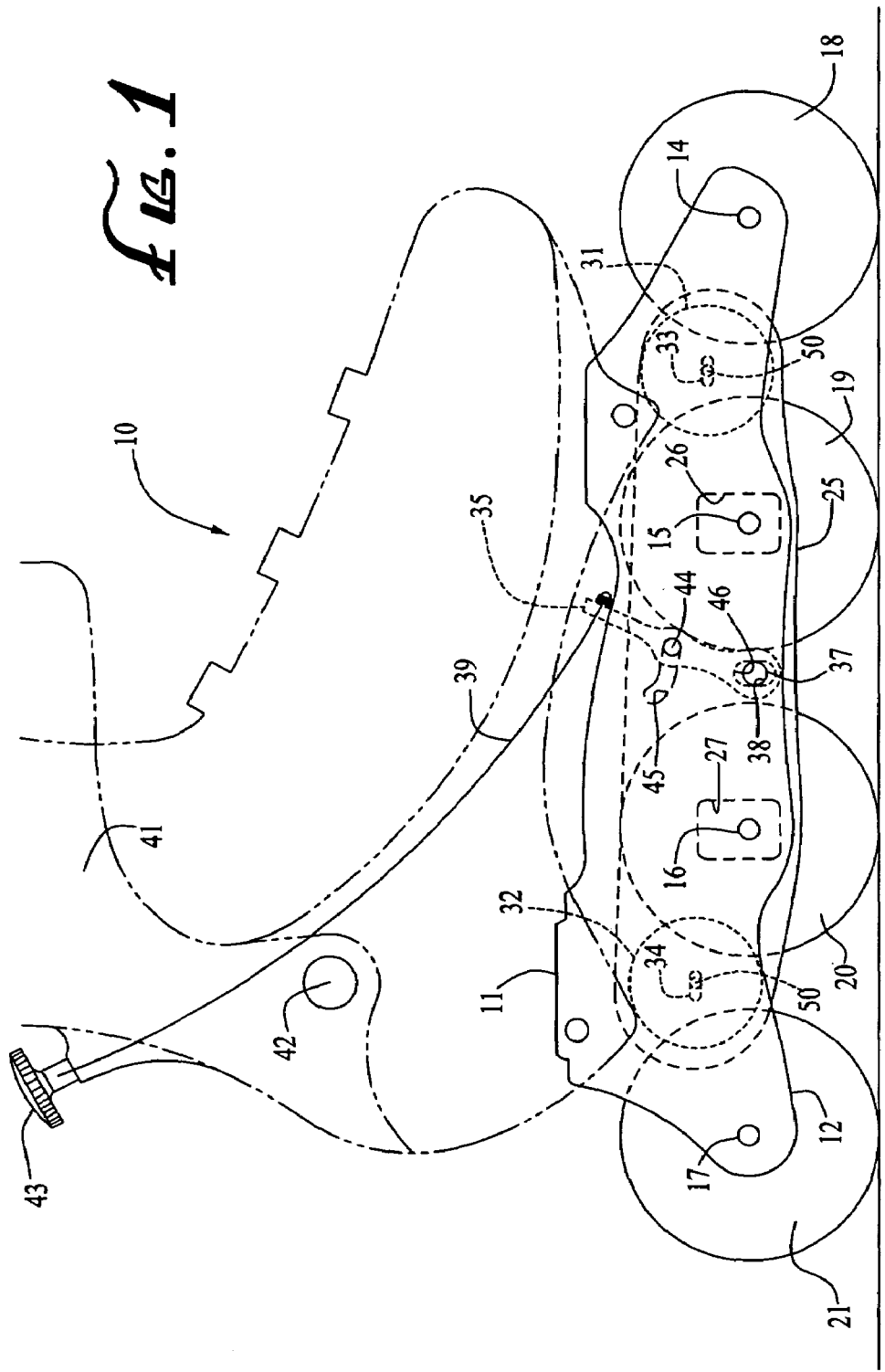
FIG. 1 is a side view of the skate brake assembly of the present invention.

The brake assembly in the present invention is shown in side view in FIG. 1. The inline skate has a boot portion 10 which supports a frame 11. Frame 11 has a right downwardly directed member 12 and a left downwardly directed member 13 shown in FIG. 2.

Figure 2:
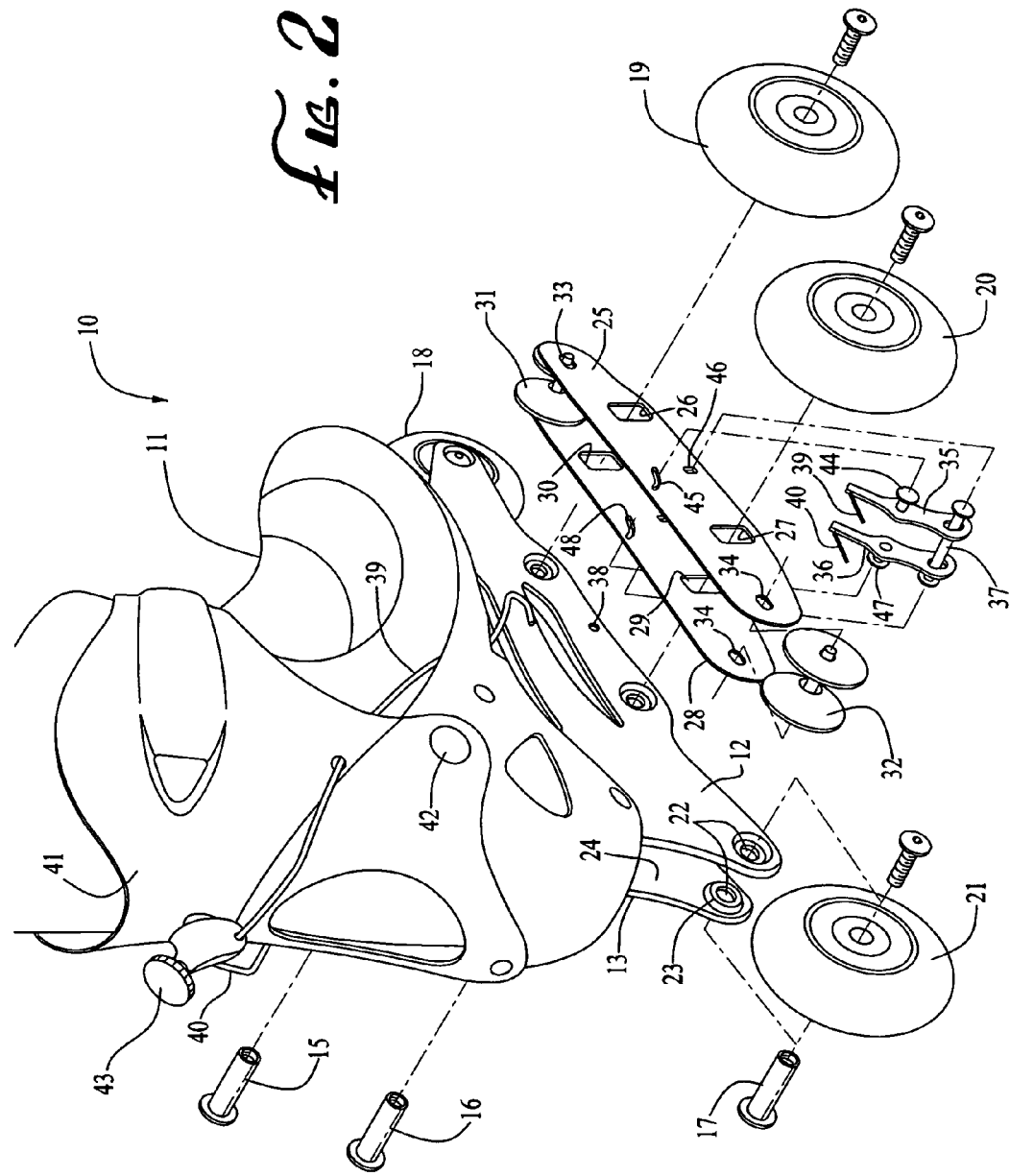
FIG. 2 is an exploded perspective view thereof.

Frame 11 supports four axles: 14, 15, 16 and 17. These axles support front wheel 18, second wheel 19, third wheel 20, and rear wheel 21, respectively, as shown in FIG. 2. Each axle, for instance, axle 17 is supported by a pair of openings 22. Each opening being surrounded by an inwardly directed protrusion 23 which extends inwardly from the inner face 24 of left downwardly directed member 13. Each axle opening has a similar protrusion which is clear from viewing FIG. 2.

While four wheels are shown in the drawing it is to be understood that the skate may have three wheels or five wheels.

A right carrier plate 25 has an elongated cutout 26 which surrounds the protrusion which surrounds axle 15. Similarly, an elongated cutout 27 surrounds the protrusion which surrounds axle 16. These cutouts and protrusions guide and position right carrier plate 25 and permit it to move up and down, but inhibit a back and forth motion. The left carrier plate 28, similarly, has elongated cutouts 29 and 30 as shown in FIG. 2.

Carrier plates 25 and 28 hold two diabolos 31 and 32. The forward diabolo 31 is held in a pair of slots 33. These slots permit a centering of a diabolo between front wheel 18 and second wheel 19 when the carrier plates are moved downwardly. This equalizes the force applied between the diabolos to wheels 18 and 19. Similarly, slots 34 hold diabolo 32 and permit it to become centered between third wheel 20 and rear wheel 21 when the carrier plates are lowered.

One way of moving the carrier plates up and down is indicated in FIGS. 1 and 2. A pair of actuating levers 35 and 36 are pivotally held to the downwardly directed frame members 12 and 13 by lever pin 37 which is secured in openings 38 shown best in FIG. 2. The actuating levers 35 and 36 are positioned inwardly with respect to carrier plates 25 and 28.

The actuating levers 35 and 36 are pivoted in a forward direction during normal skating by a cable/spoke actuator 39 on the right hand side and 40 on the left hand side. These cables/spoke members comprise force conveying members between a collar 41 which is pivoted by a pair of collar pivots 42. The cables 39 and 40 are connected to an adjuster knob 43 which easily permits the user to adjust the position of actuating lever 35 as desired.

Each actuating lever is operationally connected to one of the carrier plates by a cam and cam rider type of arrangement. Specifically, a lever cam member pin 44 passes through a carrier plate cam member slot 45. As the collar pivots in a counterclockwise direction as viewed in FIG. 1, the cable 39 rotates the actuating lever 35 in a counterclockwise direction about lever pin 37. This causes lever cam member pin 44 to ride rearwardly in slot 45 pushing the carrier plate 25 downwardly. Carrier plate 35 has an elongated opening 46 so that the up and down movement of the carrier plate is not inhibited by contact with the lever pin 37. Similarly, actuating lever 36 has a lever cam member pin moving the left carrier plate 28 up and down.

The result is an exceptionally smooth braking action applied to all four wheels. The likelihood of a wheel lock up is greatly reduced.

A front view of diabolo 31 is shown in FIG. 3 where it can be seen that diabolo 31 has an axle 50 which rides in slots 33 in the right and left carrier plates. The carrier plates 25 and 28 are held within the right and left downwardly directed members 12 and 13 of the frame. The diabolo of FIG. 3 has a right half 51 and a left half 52, each of which have a tapered surface 53 and 54. Each diabolo half has a friction inducing surface 55 and 56 which rub against the carrier plates 28 and 25, respectively when the surfaces 53 and 54 are brought into contact with the wheel surface causing the diabolo to rotate. The surfaces 53 and 54 are fabricated from a material which does not significantly cause any wear on the wheel. The friction inducing surfaces 55 and 56 are preferably made of a different material that the surfaces 53 and 54 which cause a braking action when brought into contact with the inner surface of the adjacent carrier plate. The actuating levers 35 and 36 are also shown in FIG. 3 to be positioned inwardly with respect to the carrier plates. Thus, as the diabolo halves 51 and 52 contact wheels 19 and 18, they are forced outwardly so that the friction surfaces 55 and 56 rub against carrier plates 28 and 25. This friction force is translated to wheels 18 and 19 causing them to exert a braking force. The diabolo shown in FIG. 3 has two separate halves but it is to be understood that the diabolo may be a flexible one-piece diabolo as shown in the parent application which has been incorporated by reference herein.

An alternate method of moving the carrier plates up and down is shown in FIG. 4. A right brake member 60 is pivoted with respect to frame 11. The rear end 61 of lever 60 is connected to a force conveying member or push bar 62. Push bar 62 is connected through an adjuster 63 to the rear of collar 41. Thus, when collar 41 is rotated counterclockwise as viewed in FIG. 4, the lever 60 also moves in a counterclockwise direction. Lever 60 is connected through pivot member 64 to a pair of carrier plates. The right hand carrier plate being indicated by reference carrier 65. The right hand carrier plate 65 has a pair of elongated cutouts 26 and 27 similar to those shown in FIG. 1 which surround protrusions surrounding axles 15 and 16. Thus, as collar 41 pivots rearwardly, the rear end 61 of lever 60 moves downwardly. This downward movement is translated through pivot member 64 to both carrier plates. Diabolos 31 and 32 move downwardly to contact wheels 18-19 and 20-21, respectively, as described for the construction of FIG. 1, a smooth four wheel braking action result. Because the braking action is transferred to all four wheels, the amount of wear caused by contact between the diabolos and the wheels is also proportionally reduced.

We claim:

1. A brake assembly for inline skates having a boot portion, a frame supported below said boot portion, said frame having a right and a left downwardly directed frame member, each downwardly directed frame member supporting at least four axles, each axle supporting a wheel, each frame member extending below said axles, said brake assembly comprising:

a right and a left carrier plate positioned against at least a portion of a respective opposed inner face of said right and left downwardly directed frame members said right and left carrier plates being moveable between a disengaged position and an engaged position;

at least two conical diabolos supported by said right and left carrier plates, each diabolo having a pair of wheel contacting portions, each of said diabolos comprising two brake diabolo disks rotatably held over a diabolo axle supported by said carrier plates, each of said brake diabolo disks having a tapered surface for contacting an outer surface of a pair of wheels and the tapered surface having a wider portion at an outer side and a narrower portion at an inner side and each of said diabolo disks having a friction inducing surface on an outer end of each of said two brake diabolo disks for contact with said carrier plates when said diabolo is moved into a braking position, each diabolo being positioned between two wheels so that they do not contact a wheel when said right and left carrier plates are in said disengaged position and so that a first diabolo's wheel contacting portions directly contact two wheels and a second diabolo's wheel contacting portions directly contact two different wheels from said two wheels of said first diabolo when said carrier plates are in said engaged position, thereby exerting a decelerating frictional braking force on all four wheels as a direct result of said at least two diabolos directly contacting all four wheels; and means for moving said carrier plates between said disengaged position and said engaged position.

2. The brake assembly of claim 1 wherein said means for moving said carrier plates between said disengaged position comprises a collar pivotally held about an ankle portion of said boot portion, said collar engaging one end of a force conveying member operationally connected to said right and left carrier plates and adapted to move said carrier plates between said disengaged position when said collar is in a first position and to move said carrier plates to said engaged position when said collar is in a second position.

3. The brake assembly of claim 1 wherein said downwardly directed frame members support four axles.

4. The brake assembly of claim 3 wherein said four axles support said four wheels arranged as, respectively, a front wheel, a second wheel, a third wheel and a rear wheel and one of said diabolos between said front and second wheel and another one of said diabolos between said third and said rear wheel.

5. The brake assembly of claim 1 wherein each of said frame members has a pair of openings for supporting each of said at least four axles and each of said pair of openings has a protrusion surrounding each of said pair of openings and extending inwardly from the inner face of each frame member and each of said carrier plates has at least two elongated openings surrounding and being guided by said protrusions.

6. The brake assembly of claim 1 wherein said means for moving said carrier plates between said disengaged position and said engaged position comprises at least one actuating lever being pivotally supported with respect to said frame members at a lower end, and having a lever cam member at an intermediate portion of said at least one actuating lever, said lever cam member cooperating with a carrier plate cam member so that when said actuating lever is pivotally moved, said lever cam member moves said carrier plate cam member to move said carrier plates between said disengaged position and said engaged position.

7. The brake assembly of claim 6 wherein said at least one actuating lever is moved by an attachment link between said at least one actuating lever and a collar pivotally affixed to said boot portion.

8. The brake assembly of claim 6 wherein said lever cam member is a pin and said carrier cam member is a slot through which said lever cam member passes.

9. The brake assembly of claim 7 wherein said at least one actuating lever is connected to a rear edge of said collar through a length adjusting knob.

10. The brake assembly of claim 1 wherein said means for moving said carrier plates between said disengaged position and said engaged position comprises at least one brake lever being pivotally supported at a forward end with respect to said frame members, and having a lever pivot member at an intermediate portion of said brake lever, said lever pivot member being connected to said carrier plates so that when said at least one brake lever is pivotally moved downwardly, said at lest one brake lever moves said carrier plates from said disengaged position to said engaged position, each carrier plate disposed between said forward and rear conical diabolos and a respective frame member.

11. A brake assembly for inline skates having a boot portion, a frame supported below said boot portion, said frame having a right and a left downwardly directed frame member, each downwardly directed frame member having four sets of openings for supporting four axles, each axle supporting a wheel comprising a front wheel, a second wheel, a third wheel and a rear wheel, said brake assembly comprising:

a right and a left carrier plate positioned against at least a portion of a respective opposed inner face of said right and left downwardly directed frame members and said right and left carrier plates are movably supported by said frame so that said right and left carrier plates move between an engaged position and a disengaged position;

a forward and a rear conical diabolo supported by said right and left carrier plates, said forward and rear diabolos having a pair of wheel contacting portions, each of said diabolos comprising two brake diabolo disks rotatably held over a diabolo axle supported by said carrier plates, each of said brake diabolo disks having a tapered surface for contacting an outer surface of a pair of wheels and the tapered surface having a wider portion at an outer side and a narrower portion at an inner side and each of said diabolo disks having a friction inducing surface on an outer end of each of said two brake diabolo disks for contact with said carrier plates when said diabolo is moved into a braking position, said forward diabolo being positioned vertically spaced from and equidistant between said front wheel and said second wheel and said rear diabolo being positioned vertically spaced from and equidistant between said third wheel and said rear wheel, and said forward and rear diablolos being positioned so that they do not contact a wheel when the carrier plates are in said disengaged position and so that said front diabolo's wheel contacting portions directly contact said front wheel and said second wheel, and a rear diabolo's wheel contacting portions directly contact said third wheel and said rear wheel when said carrier plates are in said engaged position; and means for moving said carrier plates between said disengaged position and said engaged position.

12. The brake assembly of claim 11 wherein said carrier plates are held in a vertically movably manner with respect to said frame members.

13. The brake assembly of claim 12 wherein said engaged position is a downward position and said disengaged position is an upward position.

* * * * *